(12) United States Patent
Chou et al.

(10) Patent No.: US 8,249,821 B2
(45) Date of Patent: Aug. 21, 2012

(54) TESTING SYSTEM AND METHOD FOR FAN MODULE

(75) Inventors: Shu-Hsien Chou, Taipei Hsien (TW); Li-Wen Guo, Shenzhen (CN); Bi-Hui Tan, Shenzhen (CN); Kang-Bin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 433 days.

(21) Appl. No.: 12/494,565

(22) Filed: Jun. 30, 2009

(65) Prior Publication Data

US 2010/0268506 A1 Oct. 21, 2010

(30) Foreign Application Priority Data

Apr. 17, 2009 (CN) .......................... 2009 1 0301641

(51) Int. Cl.
*G01P 3/00* (2006.01)
*G06F 11/26* (2006.01)

(52) U.S. Cl. ..... 702/113; 702/117; 702/145; 361/679.48

(58) Field of Classification Search .................. 702/113, 702/108, 117, 121, 145

See application file for complete search history.

(56) References Cited

U.S. PATENT DOCUMENTS

| 7,991,584 B2 * | 8/2011 | Dang et al. ..................... 702/183 |
| 2004/0186629 A1 * | 9/2004 | Frankel et al. ................ 700/300 |
| 2004/0264125 A1 * | 12/2004 | Cheng et al. ..................... 361/687 |
| 2007/0050173 A1 * | 3/2007 | Chen et al. ..................... 702/182 |
| 2007/0219756 A1 * | 9/2007 | Frankel et al. ................ 702/188 |

* cited by examiner

*Primary Examiner* — Hal Wachsman
(74) *Attorney, Agent, or Firm* — Altis Law Group, Inc.

(57) ABSTRACT

A testing method for a fan module is provided. When the fan module is tested, a testing computer sends a testing command to a testing device first. Then, the testing device responds to the testing command and controls the fan module to work in a plurality of rotational speed modes in sequence. The testing device reads an actual rotational speed when the fan module works in one of the rotational speed modes and sends the actual rotational speed back to the testing computer. The testing computer compares the actual rotational speed with a corresponding reference rotational speed value stored in the testing computer, and determines the testing result. Finally, the testing result is shown.

20 Claims, 4 Drawing Sheets

TESTING SYSTEM AND METHOD FOR FAN MODULE

BACKGROUND

1. Technical Field

The present disclosure relates to testing systems and methods, and particularly, to a testing system and method for a fan module.

2. Description of Related Art

A fan module is an important component mounted in a computer system, and is used for removing heat generated by electronic components in the computer system. Generally, the fan module must be quality tested before the fan module enters into the market for use. Conventionally, the fan module is installed in a storage system assembled to a server system. When testing the fan module, the server system is started up to operate the fan module and initialize a test procedure to test the fan module. However, such a test method needs a server system with storage system, which increases test cost. Furthermore, such a test procedure is time consuming.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
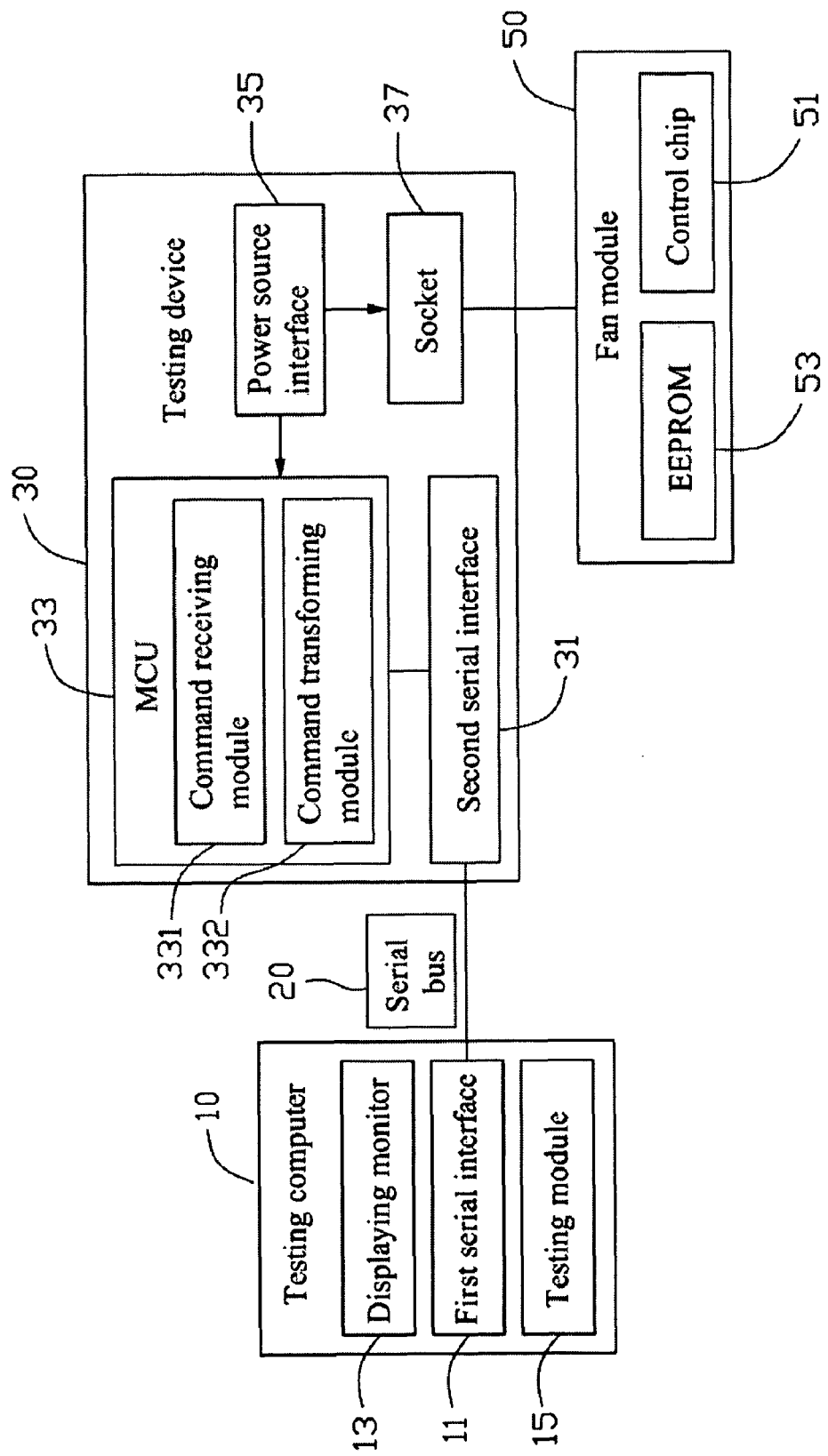
FIG. 1 is a block diagram of an embodiment of a testing system for testing a fan module.

An embodiment of a testing method for testing a fan module 50 is provided. A testing system for performing the testing method includes a testing computer 10 and a testing device 30 connected to the testing computer 10. The fan module 50 is installed on the testing device 30.

The testing computer 10 includes a first serial interface 11 and a display monitor 13. A testing module 15 is disposed in the testing computer 10, and configured to analyze the information from the testing device 30. The display monitor 13 is used for showing test results.

The testing device 30 includes a second serial interface 31 corresponding to the first serial interface 11, a Micro Control Unit (MCU) 33, a power source interface 35, and a socket 37. A serial bus 20 connects the first serial interface 11 to the second serial interface 31, thereby establishing communication between the testing computer 10 and the testing device 30. A command receiving module 331 and a command transforming module 332 are disposed in the MCU 33. The command receiving module 331 is configured to enable the testing device 30 to receive a command from the testing computer 10. The command transforming module 332 is configured to enable the testing device 30 to transform the command from the testing computer 10 into a command which the fan module 50 can identify. The fan module 50 is inserted in the socket 37 to communicate with the testing device 30. The power source interface 35 is configured to connect the MCU 33 and the socket 37 to a power supply (not shown), and provide power to the MCU 33 and to the fan module 50 via the socket 37.

The fan module 50 includes a control chip 51 and an EEPROM 53. Basic information (such as amount of fans, manufacturer and type of the control chip 51, etc.) related to the fan module 50 is stored in the control chip 51. The control chip 51 sets fan rotational modes according to commands from the MCU 33 of the testing device 30. In the testing process, the MCU 33 will read a value stored in the EEPROM 53 to identify the function of the EEPROM 53.

Figure 2:
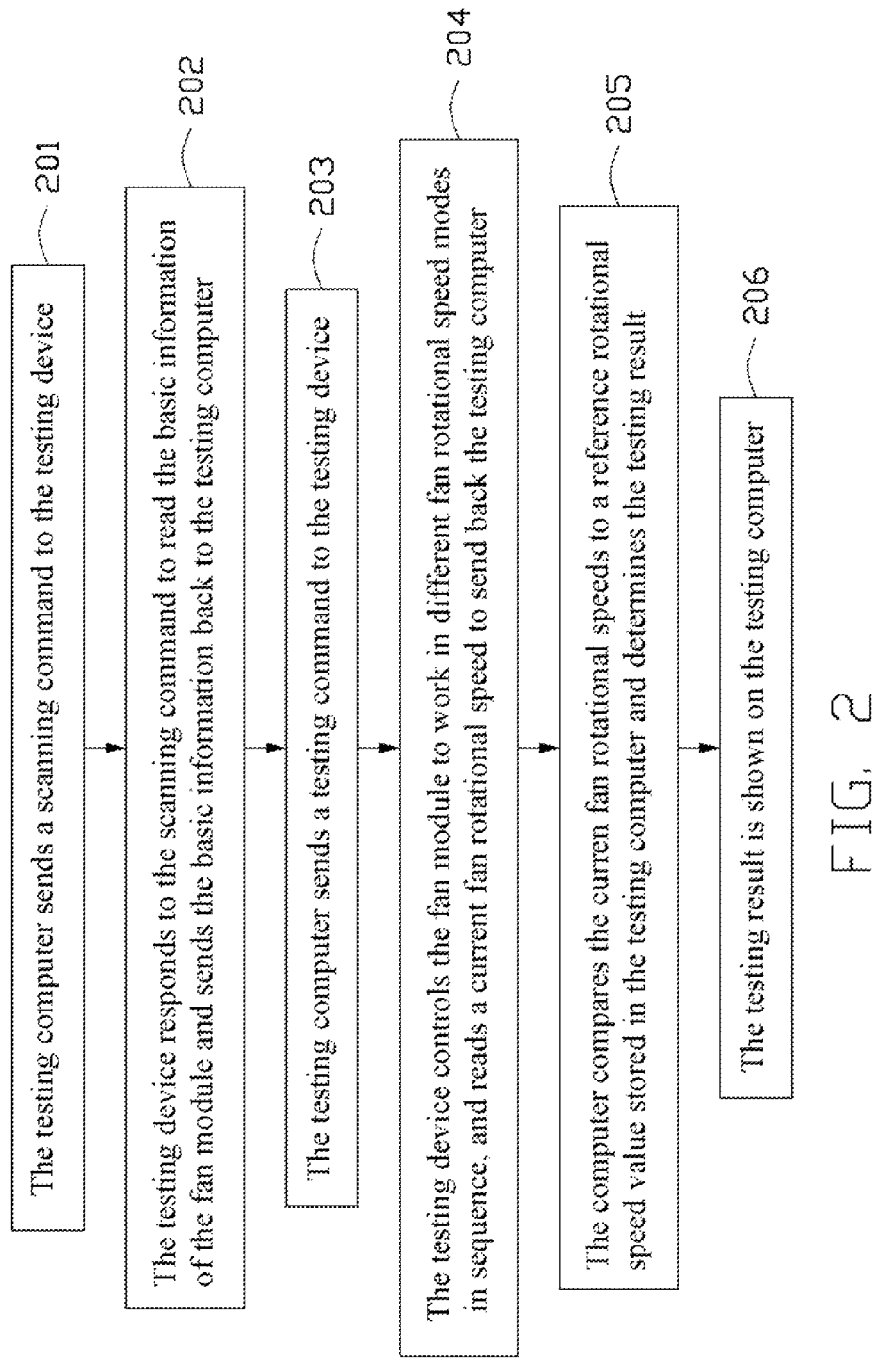
FIG. 2 is a flow chart of one embodiment of a testing method for testing a fan module.

During testing, the testing device 30 is connected to the testing computer 10 via the serial bus 20. The fan module 50 is inserted into the socket 37 of the testing device 30. Referring to FIG. 2, the testing method includes the following steps:

In step 201, the testing computer 10 sends a scanning command to the testing device 30.

In step 202, the testing device 30 responds to the scanning command. The MCU 33 of the testing device 30 reads the basic information of the fan module 50 and sends the basic information back to the testing computer 10 to be shown on the monitor 13.

In step 203, after finishing scanning, the testing computer 10 sends a testing command to the testing device 30.

In step 204, the MCU 33 of the testing device 30 controls the fan module 50 to work in a plurality of fan rotational speed modes in sequence in response to the testing command, and reads an actual fan rotational speed of the fan module 50 during each fan rotational speed mode to send back to the testing computer 10. In the present embodiment, the fan module 50 may be set to work in one or more of a default rotational speed mode, a full rotational speed mode, a half rotational speed mode, and a static mode in sequence.

In step 205, the testing module 15 in the testing computer 10 compares the actual fan rotational speed with a reference rotational speed range which is predetermined in the testing computer 10 and corresponds to the fan rotational speed mode, and determines a testing result.

In step 206, the testing result is shown on the monitor 13 of the testing computer 10.

Figure 3A:
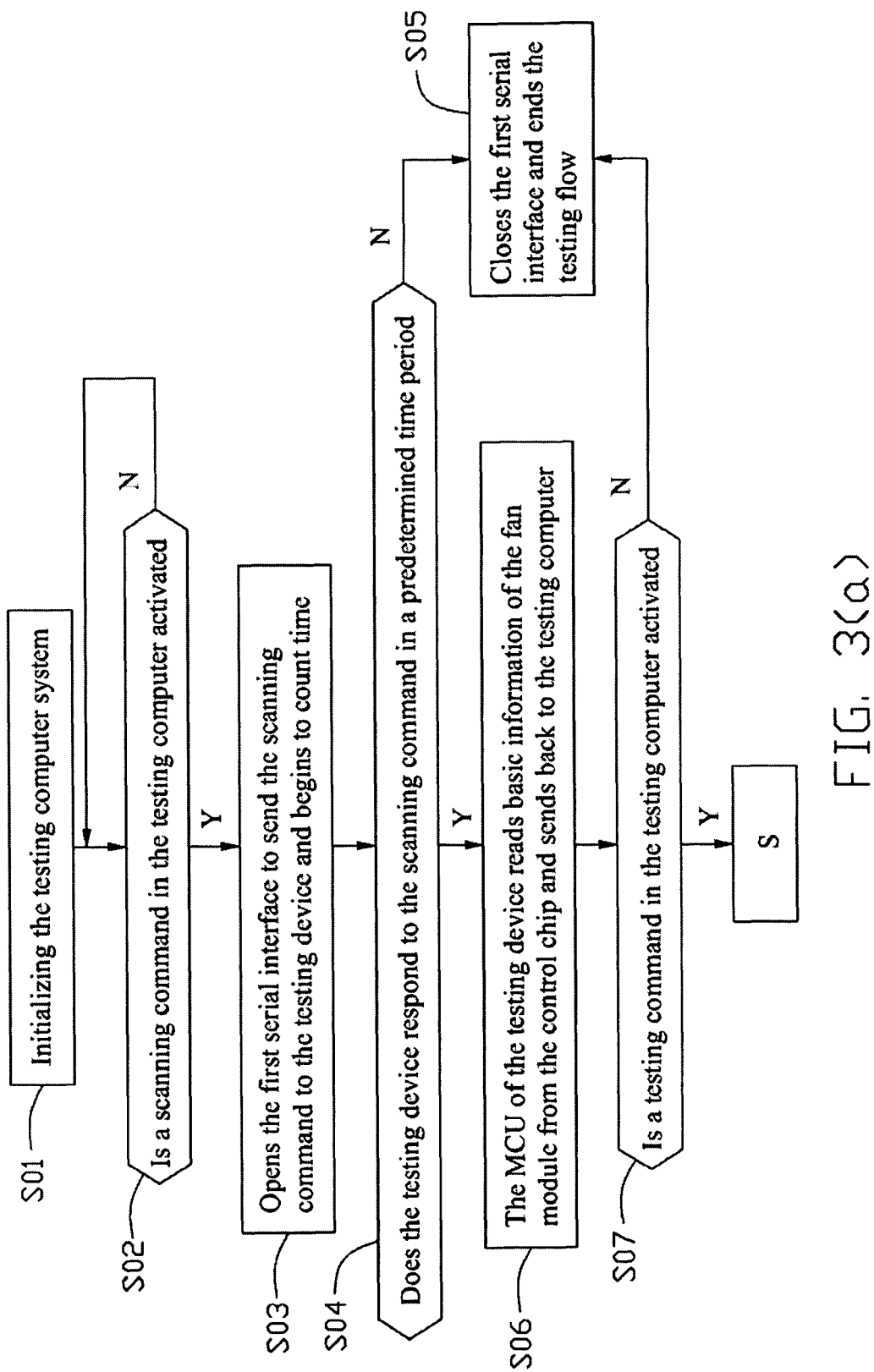
FIGS. 3(a) and 3(b) are detailed flow charts of the testing method of FIG. 2.
Figure 3B:
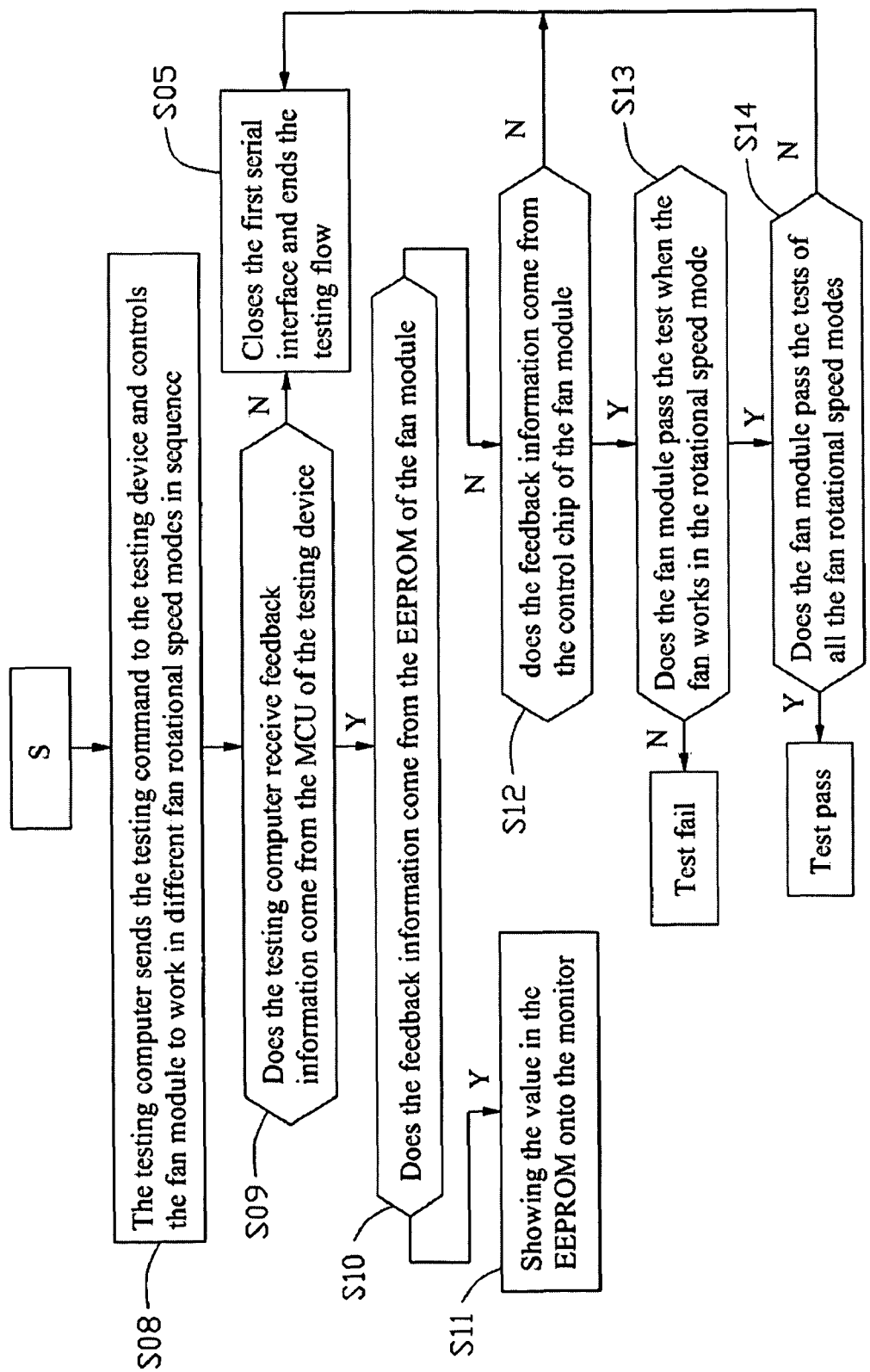

Referring to FIGS. 3(a) and 3(b), a detailed testing flow for the fan module 50 is described as follows:

Step 01: Initialize the testing computer system and install a fan module 50 to be tested.

Step 02: Determine whether a scanning command in the testing computer 10 is activated. If the scanning command is activated, the testing flow goes to step 03; otherwise, the testing computer 10 waits for an action of activating the scanning command.

Step 03: The testing computer 10 opens the first serial interface 11 to send the scanning command to the testing device 30 and begins timing.

Step 04: Detect whether the testing device 30 responds to the scanning command in a predetermined time period. If the testing device 30 responds to the scanning command, the testing flow goes to step 06; otherwise, the testing computer 10 identifies that the testing system is connected in error and the test flow goes to step 05.

Step 05: The testing computer 10 closes the first serial interface 11 and ends the testing flow. Testing result information is shown on the monitor 13.

Step 06: The MCU 33 of the testing device 30 reads basic information of the fan module 50 from the control chip 51 and sends the basic information back to the testing computer 10. The basic information is shown on the monitor 13.

Step 07: Determine whether a testing command in the testing computer 10 is activated. If the testing command is activated, the testing flow goes to step 08; otherwise, the test flow goes back to step 05.

Step 08: The testing computer 10 sends the testing command to the testing device 30. The testing device 30 controls the fan module 50 to work in a plurality of fan rotational speed modes in sequence and reads fan information (such as an actual fan rotational speed during each fan rotational speed mode) and the value in the EPPROM 53.

Step 09: Detect whether the testing computer receives feedback information comes from the MCU 33 of the testing device 30. If the testing computer 10 receives feedback information from the MCU 33, the test flow goes to step 10; otherwise, the test flow goes back to step 05.

Step 10: Determine whether the feedback information comes from the EEPROM 53 of the fan module 50. If the feedback information comes from the EEPROM 53, the test flow goes to step 11; otherwise, the test flow goes to step 12.

Step 11: Show the value in the EEPROM 53 on the monitor.

Step 12: Determine whether the feedback information comes from the control chip 51 of the fan module 50. If the feedback information comes from the control chip 51, the test flow goes to step 13; otherwise, the test flow goes back to step 05.

Step 13: The testing computer 10 compares the actual fan rotational speed during the current fan rotational speed mode with the corresponding reference rotational speed range, and determines whether the fan module 50 passes the test when the fan works in the rotational speed mode. If the fan module 50 passes the test when the fan works in the rotational speed mode, the test flow goes to step 14; otherwise, the fan module 50 fails, and the test flow goes back to step 05.

Step 14: Determine whether the fan module 50 passes the tests of all the fan rotational speed modes. If the fan module 50 passes the tests of all the fan rotational speed modes, the fan module 50 passes, and the test flow goes back to step 05; otherwise, the fan module 50 fails, and the test flow goes back to step 05.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A testing method for a fan module, the method comprising:
    sending a testing command to a testing device from a testing computer;
    controlling the fan module, by the testing device, to work in a plurality of rotational speed modes in sequence in response to the testing command;
    reading an actual rotational speed of each rotational speed mode and sending the actual rotational speed information back to the testing computer;
    comparing the actual rotational speed of each rotational speed with a corresponding reference rotational speed range stored in the testing computer;
    obtaining a testing result after comparing the actual rotational speed with the corresponding reference rotational speed range; and
    displaying the testing result on a display monitor.

2. The testing method of claim 1, further comprising detecting whether the fan module is electrically connected to the testing device before the testing computer sends the testing command to the testing device.

3. The testing method of claim 2, wherein if the fan module is electrically connected to the testing device, the testing computer sends a scanning command to the testing device before sending the testing command, and the testing device reads basic information of the fan module and sends the basic information back to the testing computer in response to the scanning command.

4. The testing method of claim 3, wherein the testing device reads the basic information via a micro controller unit.

5. The testing method of claim 3, wherein the testing computer comprises a first serial interface, and the testing computer opens the first serial interface to send the scanning command to the testing device before the testing device responds to the scanning command.

6. The testing method of claim 5, wherein the testing computer begins to count time when the first serial interface is opened, and if the testing computer fails to receive the basic information from the testing device, the testing computer determines the fan module is connected to the testing device in error, and closes the first serial interface.

7. The testing method of claim 1, wherein the fan module is controlled to rotate in at least one of a default speed mode, a full speed mode, and a half speed mode, or is in a static mode.

8. The testing method of claim 1, wherein the step of obtaining the testing result comprises: if one of the actual rotation speeds is out of the corresponding reference rotational speed range, the testing computer shows that the testing result is fail; if all of the actual rotation speeds are consistent with the corresponding reference rotational speed ranges, the testing result is pass.

9. The testing method of claim 1, wherein the fan module comprises an EEPROM, the testing device reads a value from the EEPROM and sends the value to the testing computer, and the test computer shows the value and determines the EEPROM performance according to the value.

10. The testing method of claim 1, wherein the testing device controls the fan module to work in the plurality of rotational speed modes and reads the fan speed mode from the fan module via a micro controller unit.

11. A testing method for a fan module, comprising:
    sending a testing command to a testing device from a testing computer;
    controlling the fan module, by the testing device, to work in different rotational speed modes;
    reading an actual rotational speed when the fan module works in one of the rotational speed modes and sending the actual rotational speed back to the testing computer;
    comparing the actual rotational speed with a corresponding reference rotational speed range stored in the testing computer; and
    if the actual rotational speed of one rotational speed mode is out of the corresponding reference rotational speed range, the testing computer shows that the testing result is fail; and
    if all of the actual rotational speeds of the different rotational speed modes are consistent with the corresponding reference rotational speed ranges, the testing result is pass.

12. The testing method of claim 11, wherein the testing device detects weather the fan module is electrically connected to the testing device before the testing computer sends the testing command to the testing device.

13. The testing method of claim 12, wherein if the fan module is electrically connected to the testing device, the testing computer sends a scanning command to the testing device before sending the testing command, and the testing device responds to the scanning command to read basic information of the fan module and send the basic information back to the testing computer.

14. The testing method of claim 13, wherein the testing computer comprises a first serial interface, and the testing computer opens the first serial interface to send the scanning command to the testing device before the testing device responds to the scanning command.

15. The testing method of claim 14, wherein the testing computer begins to count time when the first serial interface is opened, and if the testing computer fails to receive the basic information from the testing device, the testing computer determines the fan module is connected to the testing device in error, and closes the first serial interface.

16. The testing method of claim 11, wherein the fan module is controlled to rotate in at least two rotational speed modes of a default speed mode, a full speed mode, a half speed mode, and a static mode in sequence.

17. The testing method of claim 11, wherein the fan module comprises an EEPROM, the testing device reads a value from the EEPROM and sends the value to the test computer, and the test computer shows the value and determines the EEPROM performance according to the value.

18. A testing system for testing a fan module, the fan module comprises a control chip, the testing system comprising:
- a testing computer with a testing module disposed therein; and
- a testing device connected to the testing computer, the testing device comprising a micro controller unit and a socket configured for the fan module inserted therein to be in communication with the micro controller unit; the micro controller unit is adapted to receive a command from the testing computer and transferring the command to the control chip of the fan module via the socket.

19. The testing system of claim 18, wherein the testing computer comprises a test module adapted to send test commands to the micro controller unit to cause the fan module to perform according to the test command and read test information from the control chip to send back to the testing computer.

20. The testing system of claim 18, wherein the testing computer comprises a first serial interface, the testing device comprises a second serial interface, and a serial bus connects the first serial interface to the second serial interface to establish communication between the testing computer and the testing device.

* * * * *